United States Patent
Tan et al.

(10) Patent No.: US 10,459,096 B2
(45) Date of Patent: Oct. 29, 2019

(54) JOINT FULL WAVEFIELD INVERSION OF P-WAVE VELOCITY AND ATTENUATION USING AN EFFICIENT FIRST ORDER OPTIMIZATION

(71) Applicants: Sirui Tan, Spring, TX (US); Yaxun Tang, Spring, TX (US); Anatoly I. Baumstein, Houston, TX (US); Gboyega Ayeni, Humble, TX (US); Tetyana Vdovina, Spring, TX (US); Thomas A. Dickens, Houston, TX (US)

(72) Inventors: Sirui Tan, Spring, TX (US); Yaxun Tang, Spring, TX (US); Anatoly I. Baumstein, Houston, TX (US); Gboyega Ayeni, Humble, TX (US); Tetyana Vdovina, Spring, TX (US); Thomas A. Dickens, Houston, TX (US)

(73) Assignee: ExxonMobil Upstream Research Company, Spring, TX (US)

(*) Notice: Subject to any disclaimer, the term of this patent is extended or adjusted under 35 U.S.C. 154(b) by 241 days.

(21) Appl. No.: 15/614,960

(22) Filed: Jun. 6, 2017

(65) Prior Publication Data

US 2018/0017690 A1    Jan. 18, 2018

Related U.S. Application Data

(60) Provisional application No. 62/361,566, filed on Jul. 13, 2016.

(51) Int. Cl.
*G01V 1/28* (2006.01)
*G01V 1/30* (2006.01)
(Continued)

(52) U.S. Cl.
CPC .......... *G01V 1/282* (2013.01); *G01V 1/303* (2013.01); *G01V 1/368* (2013.01); *G06F 17/11* (2013.01)

(58) Field of Classification Search
CPC .......... G01V 1/11; G01V 1/368; G01V 1/303; G01V 1/282; G01V 1/00; G06F 17/11
See application file for complete search history.

(56) References Cited

U.S. PATENT DOCUMENTS

2012/0143506 A1* 6/2012 Routh ............... G01V 1/282
                                                                   702/2
2013/0311149 A1   11/2013 Tang et al.
(Continued)

OTHER PUBLICATIONS

Fengxia Gao and Yanghua Want, "Simultaneous inversion for velocity and attenuation by waveform tomography", J Applied Geophysics 131 (May 2016).*

(Continued)

*Primary Examiner* — Mohamed Charioui
*Assistant Examiner* — Catherine T. Rastovski
(74) *Attorney, Agent, or Firm* — ExxonMobil Upstream Research Company—Law Department

(57) ABSTRACT

A method for iteratively inverting seismic data to jointly infer a model for at least P-wave velocity and attenuation parameters of the subsurface, the method including: jointly inverting the P-wave velocity and attenuation parameters with an iterative visco-acoustic full wavefield inversion process, wherein the iterative visco-acoustic full wavefield inversion process includes computing a gradient of an objective function, the objective function measuring a misfit between all or part of the seismic data and corresponding model-simulated seismic data; for each of the P-wave velocity and attenuation parameters, computing a search direction in model space from the gradient; determining line search step sizes α and β for the search directions for the P-wave (Continued)

velocity and attenuation parameters, respectively, wherein a ratio of the step sizes is a function of the P-wave velocity parameter; and using the step sizes $\alpha$ and $\beta$ and the search directions for each of the P-wave velocity and attenuation parameters, computing a new search direction in model space, then performing a line search along the new search direction to arrive at a new step size, and using the new step size and the new search direction to generate an updated model for a current iteration of the iterative visco-acoustic full wavefield inversion process.

5 Claims, 3 Drawing Sheets

(51) Int. Cl.
*G01V 1/36* (2006.01)
*G06F 17/11* (2006.01)

(56) References Cited

U.S. PATENT DOCUMENTS

| | | |
|---|---|---|
| 2015/0323689 A1 | 11/2015 | Tang et al. |
| 2015/0362622 A1 | 12/2015 | Denli et al. |
| 2017/0097428 A1 | 4/2017 | Sun et al. |

OTHER PUBLICATIONS

Malinowski et al, "High-resolution seismic attenuation imaging from wide-aperture onshore data by visco-acoustic frequency-domain full-waveform inversion", Geophys J. Int. 186 (2011).*

Bai, J., et al. (2014) "Viscoacoustic waveform inversion of velocity structures in the time domain". *Geophysics*, 79(3), pp. R103-R119.

Cheng, X., et al. (2015) "A New Approach of Visco-Acoustic Waveform Inversion in the Time Domain" *2015 SEG Annual Meeting. Society of Exploration Geophysicists*; pp. 1183-1187.

Denli, H., et al. (2013) "Full-wavefield inversion for acoustic wave velocity and attenuation" *2013 SEG Annual Meeting. Society of Exploration Geophysicists*; pp. 980-985.

Malinowski, M., et al. (2011) "High-resolution seismic attenuation imaging from wide-aperture onshore data by visco-acoustic frequency-domain full-waveform inversion" *Geophysical Journal International*, 186(3), pp. 1179-1204.

Plessix, R.E., et al. (2016) "Visco-acoustic full waveform inversion". *Geophysics* vol. 75; pp. WCC149-WCC157.

Prieux, V., et al. (2012). "Multiparameter full waveform inversion of multicomponent ocean-bottom-cable data from Valhall. Part 1 imaging compressional wavespeed, density and attenuation" *Geophysical Journal International*, 194(3), pp. 1640-1664.

Tarantola, A., (1984) "Inversion of seismic reflection data in the acoustic approximation" *Geophysics*, 49, pp. 1259-1266.

Gao, F., et al. (May 27, 2016) "Simultaneous inversion for velocity and attenuation by waveform tomography", *Journal of Applied Geophysics*, vol. 131, pp. 103-108.

* cited by examiner

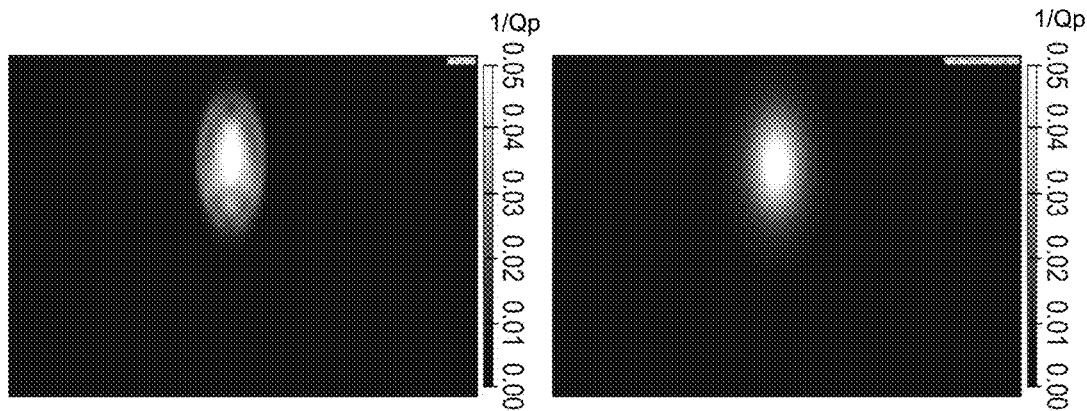
*FIG. 4A*  *FIG. 4B*
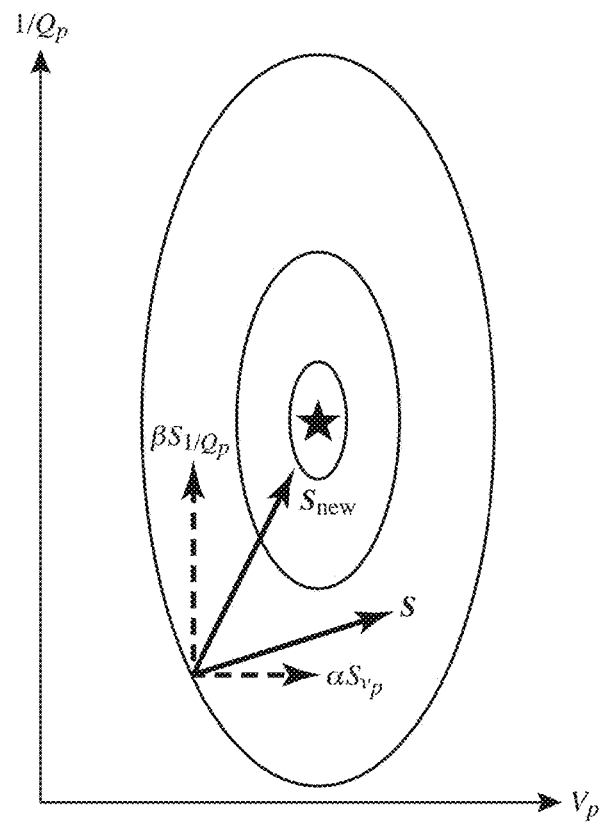
*FIG. 5*

JOINT FULL WAVEFIELD INVERSION OF P-WAVE VELOCITY AND ATTENUATION USING AN EFFICIENT FIRST ORDER OPTIMIZATION

CROSS-REFERENCE TO RELATED APPLICATION

This application claims the benefit of U.S. Provisional Patent Application 62/361,566 filed Jul. 13, 2016 entitled JOINT FULL WAVEFIELD INVERSION OF P-WAVE VELOCITY AND ATTENUATION USING AN EFFICIENT FIRST ORDER OPTIMIZATION, the entirety of which is incorporated by reference herein.

FIELD OF THE INVENTION

This disclosure relates generally to the field of geophysical prospecting and, more particularly, to seismic data processing. Specifically the disclosure relates to a method for performing joint full wavefield inversion ("FWI") of P-wave velocity and attenuation to infer a subsurface physical property model.

BACKGROUND OF THE INVENTION

This section is intended to introduce various aspects of the art, which may be associated with exemplary embodiments of the present technological advantage. This discussion is believed to assist in providing a framework to facilitate a better understanding of particular aspects of the present technological advancement. Accordingly, it should be understood that this section should be read in this light, and not necessarily as admissions of prior art.

An important goal of seismic prospecting is to accurately image subsurface structures commonly referred to as reflectors. Seismic prospecting is facilitated by obtaining raw seismic data during performance of a seismic survey. During a seismic survey, seismic energy can be generated at ground or sea level by, for example, a controlled explosion (or other form of source, such as vibrators), and delivered to the earth. Seismic waves are reflected from underground structures and are received by a number of sensors/receivers, such as geophones. The seismic data received by the geophones is processed in an effort to create an accurate mapping of the underground environment. The processed data is then examined with a goal of identifying geological formations that may contain hydrocarbons (e.g., oil and/or natural gas).

Full wavefield inversion is a nonlinear inversion technique that recovers the earth model by minimizing the mismatch between the simulated and the observed seismic wavefields. The Earth model comprises multiple parameters: P-wave velocity, anisotropy, attenuation, etc. In particular, seismic attenuation describes the fact that Earth's interior dissipates and disperses propagating seismic waves. The attenuation effects are particularly prominent in the presence of gas. If attenuation was not taken into account in FWI, the inverted P-wave velocity will be lower than it should be (e.g., Cheng et al., 2015). Furthermore, if unreliable velocity models are used for seismic depth imaging, the structures beneath gas bodies would be distorted. Therefore, attenuation plays an important role in correct estimation of P-wave velocity. P-waves, or compressional waves, are waves in which the vibrations occur in the direction of propagation of the waves.

Both P-wave velocity (Vp) and P-wave attenuation quality factor (Qp) have impact on the travel time of the propagating waves. Thus, there is significant ambiguity between the two parameters. Conventional FWI results suffer from crosstalk: the estimated Vp or Qp is a combination of the true Vp and true Qp.

Seismic waves attenuate for a variety of reasons as they travel in a subsurface environment. A quality metric (sometimes referred to a quality factor) Q is typically used to represent attenuation characteristics of underground formations. In general, Q is inversely proportional to seismic signal attenuation and may range from a value of zero to infinity. More specifically, Q is a dimensionless quality factor that is a ratio of the peak energy of a wave to the dissipated energy. As waves travel, they lose energy with distance and time due to absorption. Such energy loss must be accounted for when restoring seismic amplitudes to perform fluid and lithologic interpretations, such as amplitude versus offset (AVO) analysis. Structures with a relatively high Q value tend to transmit seismic waves with little attenuation. Structures that tend to attenuate seismic energy to a greater degree have lower Q values.

As a multi-parameter optimization problem, FWI of Vp and Qp can be solved using the first-order or second-order optimization methods. On the one hand, the first-order optimization methods, such as steepest descent or nonlinear conjugate gradient, utilize the gradient information of the objective function to define a search direction. Bai et al. (2013) developed cascaded single parameter inversions using the first-order optimization method, i.e., inverting for Qp with fixed Vp and then inverting for Vp with fixed Qp. When the starting models are far away from the true models, cascaded inversions may fail to converge because of the strong dependency between Vp and Qp. Cheng et al. (2015) performed FWI for Vp using the first-order optimization method with fixed background Qp, then derived locally anomalous Qp from the inverted Vp model. The Qp model heavily relies on the assumption on the correlation between Vp and Qp. The efficient line search methods developed by Tang and Ayeni (2015) can be used to estimate the relative scales between the Vp and Qp updates. However, the computational cost is higher compared to the method of the present technological advancement.

On the other hand, second-order methods utilize both the gradient and curvature information of the objective function to determine an optimal search direction (Malinowski et al., 2011; Prieux et al. 2012; Denli et al., 2013). The curvature information is valuable for multi-parameter FWI because it balances the gradient of different parameter classes (e.g., Vp and Qp) and provides meaningful updates for parameter classes with different data sensitivity. The computation associated with the curvature information is however very expensive, which is the main obstacle that prevents the second-order method from being widely used in practice.

A widely used local optimization technique is the gradient-based first-order method, (e.g., steepest descent or nonlinear conjugate gradient), which utilizes only the gradient information of the objective function to define a search direction. Although a gradient-only first-order method is relatively efficient—it requires computing only the gradient of the objective function—its convergence is generally slow. The convergence of FWI can be improved significantly by using a second-order method. This improved convergence is achieved because second-order methods utilize both the gradient and curvature information of the objective function to determine an optimal search direction in model parameter space. (The search direction unit vector s is related to the model update process by $m_{updated}=m+\alpha s$, where $\alpha$ (a scalar) is the step size.)

The major difference between first and second order methods is that second-order methods precondition the gradient with the inverse Hessian (e.g., Gauss-Newton/Newton method), or with the inverse of a projected Hessian (e.g., subspace method). The Hessian is a matrix of second-order partial derivatives of the objective function with respect to the model parameters. In general, second-order methods are attractive not only because of their relative fast convergence rate, but also because of the capability to balance the gradients of different parameter classes and provide meaningful updates for parameter classes with different data sensitivities (e.g., velocity, anisotropy, attenuation, etc.) in the context of multi-parameter inversion. In second-order methods, optimum scaling of parameter classes using the Hessian is crucial in multi-parameter inversion, if such parameter classes are to be simultaneously inverted. However, because it is very expensive to compute the inverse of the Hessian, this is a major obstacle for wide adoption of second-order methods in practice. Another disadvantage of second-order methods is that if the objective function is not quadratic or convex (e.g., where the initial model is far from the true model), the Hessian or its approximation may not accurately predict the shape of the objective function. Hence, the gradients for different parameter classes may not be properly scaled, thereby resulting in suboptimal search directions.

SUMMARY OF THE INVENTION

A method for iteratively inverting seismic data to jointly infer a model for at least P-wave velocity and attenuation parameters of the subsurface, the method including: jointly inverting the P-wave velocity and attenuation parameters with an iterative visco-acoustic full wavefield inversion process, wherein the iterative visco-acoustic full wavefield inversion process includes computing a gradient of an objective function, the objective function measuring a misfit between all or part of the seismic data and corresponding model-simulated seismic data; for each of the P-wave velocity and attenuation parameters, computing a search direction in model space from the gradient; determining line search step sizes α and β for the search directions for the P-wave velocity and attenuation parameters, respectively, wherein a ratio of the step sizes is a function of the P-wave velocity parameter; and using the step sizes α and β and the search directions for each of the P-wave velocity and attenuation parameters, computing a new search direction in model space, then performing a line search along the new search direction to arrive at a new step size, and using the new step size and the new search direction to generate an updated model for a current iteration of the iterative visco-acoustic full wavefield inversion process.

In the method, the step sizes can satisfy $$\frac{\beta}{\alpha} \approx -\frac{\pi}{V_p \log\left(\frac{\omega}{\omega_0}\right)},$$

wherein $V_p$ is the P-wave velocity parameter, $\omega$ is frequency and $\omega_o$ is a reference frequency.

In the method, the obtaining the starting P-wave velocity model can include determining, with a computer, the starting P-wave velocity model from an iterative acoustic full wavefield inversion process, wherein the iterative acoustic full wavefield inversion process includes using a cross-correlation objective function to minimize a misfit between all or part of the seismic data and corresponding model-simulated seismic data.

In the method, the objective function can be an L2 objective function.

In the method, the objective function can be a cross-correlation objective function.

The method can further include generating a subsurface image from the updated model; and using the subsurface image to prospect for hydrocarbons.

BRIEF DESCRIPTION OF THE DRAWINGS

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles.

The present invention and its advantages will be better understood by referring to the following detailed description and the attached drawings in which:

FIG. 4A illustrates an example of an inverted 1/Qp model obtained from a viscoacoustic FWI process;

FIG. 4B illustrates the true 1/Qp model for FIG. 4A; and

FIG. 5 illustrates an example of the determination of a new search direction in model space.

DETAILED DESCRIPTION OF EXAMPLE EMBODIMENTS

Exemplary embodiments are described herein. However, to the extent that the following description is specific to a particular embodiment, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

The present technological advancement can invert for both Vp and Qp with mitigated crosstalk between the two parameters. This can be accomplished with an efficient first-order optimization method for joint FWI of Vp and Qp.

However, the present technological advancement is not limited to first-order optimization methods.

Figure 1:
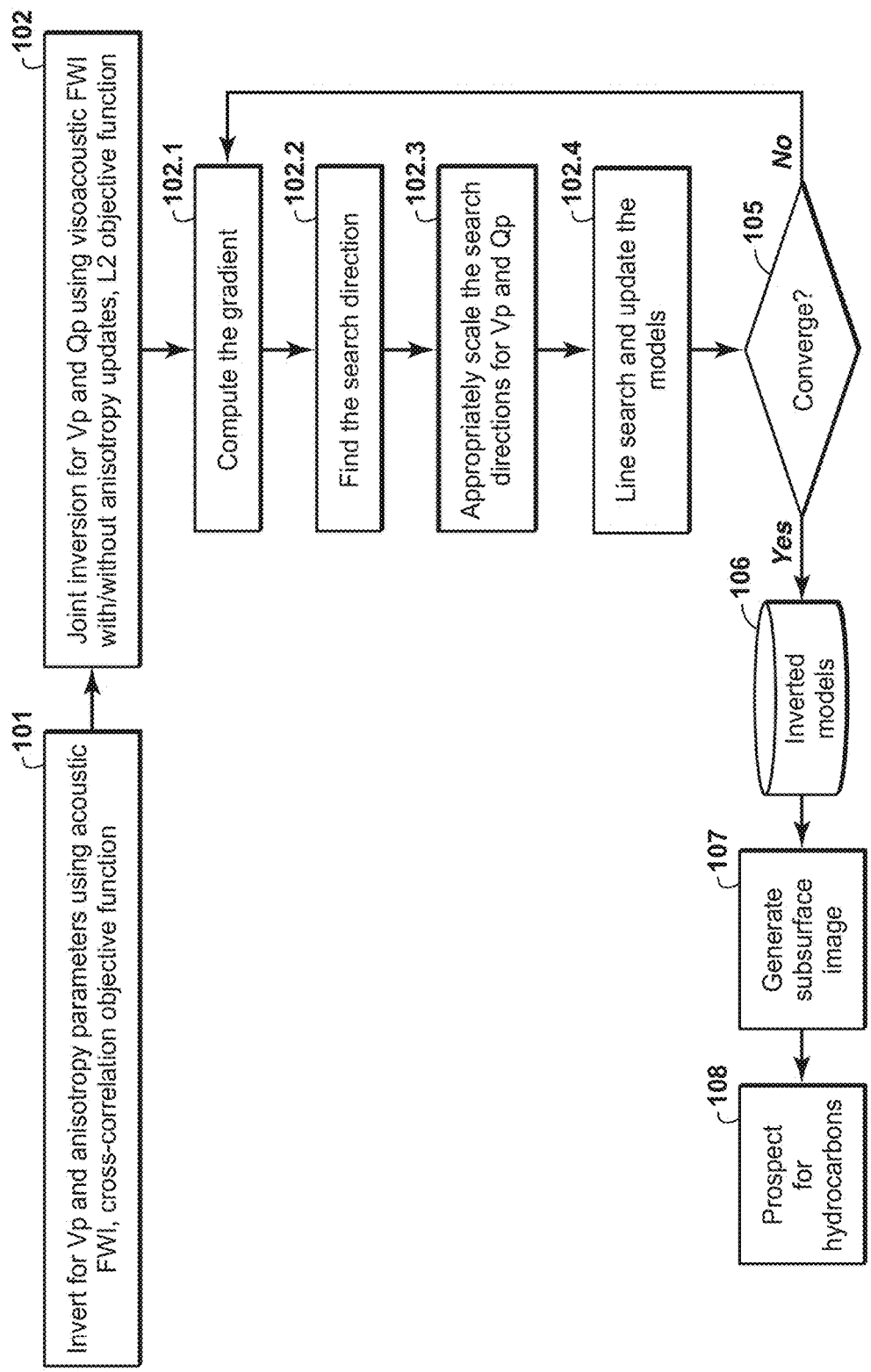
FIG. 1 illustrates an exemplary method for jointly inverting P-wave velocity and attenuation.

FIG. 1 illustrates an exemplary method utilizing the present technological advancement. Step 101 includes inverting for Vp and/or anisotropic parameters (e.g., Thomsen parameters ε, δ, and γ) using acoustic FWI with a cross-correlation objective function. Step 101 does not have to take attenuation into account.

The delta parameter, the short offset effect, captures the relationship between the velocity required to flatten gathers (the normal moveout velocity) and the zero-offset average velocity as recorded by checkshots. The epsilon parameter, the long offset effect, is the fractional difference between vertical and horizontal P velocities; i.e., it is the parameter usually referred to as the anisotropy of a rock. The gamma parameter, the shear wave effect, relates a horizontal shear wave with horizontal polarization to a vertical shear wave.

FWI is a computer-implemented geophysical method that is used to invert for subsurface properties such as velocity or acoustic impedance. The crux of any FWI algorithm can be described as follows: using a starting subsurface physical property model, synthetic seismic data are generated, i.e. modeled or simulated, by solving the wave equation using a numerical scheme (e.g., finite-difference, finite-element etc.). The term velocity model or physical property model as used herein refers to an array of numbers, typically a 3-D array, where each number, which may be called a model parameter, is a value of velocity or another physical property in a cell, where a subsurface region has been conceptually divided into discrete cells for computational purposes. The synthetic seismic data are compared with the field seismic data and using the difference between the two, an error or objective function is calculated. Using the objective function, a modified subsurface model is generated which is used to simulate a new set of synthetic seismic data. This new set of synthetic seismic data is compared with the field data to generate a new objective function. This process is repeated until the objective function is satisfactorily minimized and the final subsurface model is generated. A global or local optimization method is used to minimize the objective function and to update the subsurface model.

The cross-correlation objective function is commonly used in seismic inversion to match the phase of the data, and it is often considered to be robust when precise amplitudes cannot fit the simulation physics. A typical normalized cross-correlation objective function is given by:

$$\mathcal{F} = \frac{\psi_{obs} \otimes \psi_{calc}}{\|\psi_{obs}\|\|\psi_{calc}\|}$$

where $\psi_{obs}$ is the measured data, $\psi_{calc}$ is the calculated data, and $\otimes$ is the non-zero lag cross-correlation operator.

Figure 2C:
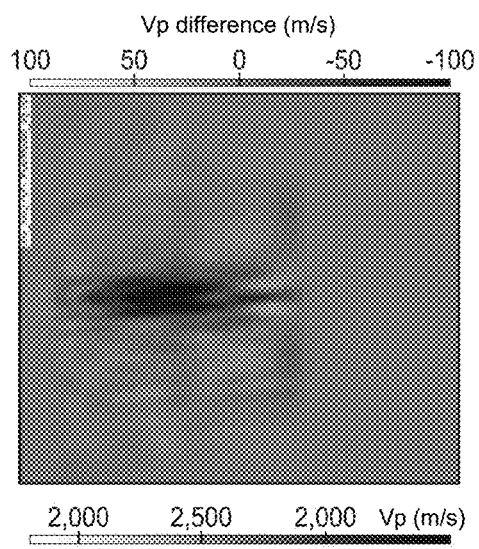
FIG. 2C illustrates the difference between FIGS. 2A and 2B.
Figure 2B:
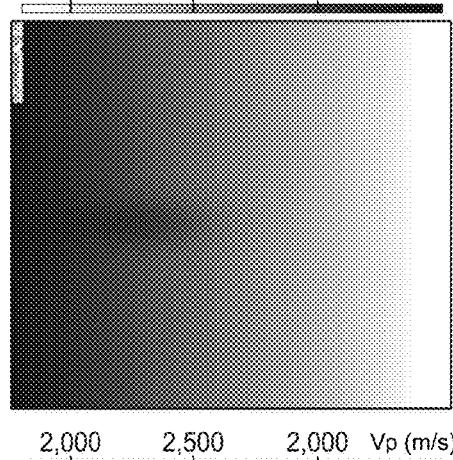
FIG. 2B illustrates the true P-wave velocity model for FIG. 2A.
Figure 2A:
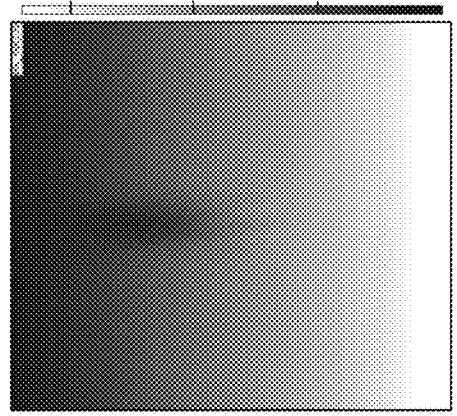
FIG. 2A illustrates an example of an inverted P-wave velocity model obtained from an acoustic FWI process.

The cross-correlation objective function is used in step 101 with the aim of fitting the travel time of the data. With step 101, the process is able to fit the travel time of the data to a large extent, but with an incorrect velocity model. FIG. 2A illustrates an example of the inverted Vp model after step 101, together with the true Vp model (FIG. 2B) and the difference between the left and middle panels (FIG. 2C). Compared with the true Vp model, the inverted velocity is lower in the strong attenuation area. This is because FWI puts all attenuation efforts into the P-wave velocity. In FIG. 2A, the inverted Vp has the correct geometry, but the values are lower than the true velocity model.

In step 102, starting from the velocity model obtained in step 101 or another starting velocity model, joint inversion for Vp and Qp is carried out using a viscoacoustic FWI process with or without updates to or inverting for the anisotropic parameters. In step 102, an L2 objective function can be used in order to fit the amplitude of the data. The L2 objective function may be preferred when the initial Qp model is merely background (i.e., the initial Qp model does not include an indication of an anomaly). If the initial Qp model does include an indication of an anomaly, then step 101 can be omitted and step 102 can be implemented with the cross-correlation objective function.

Figure 3C:
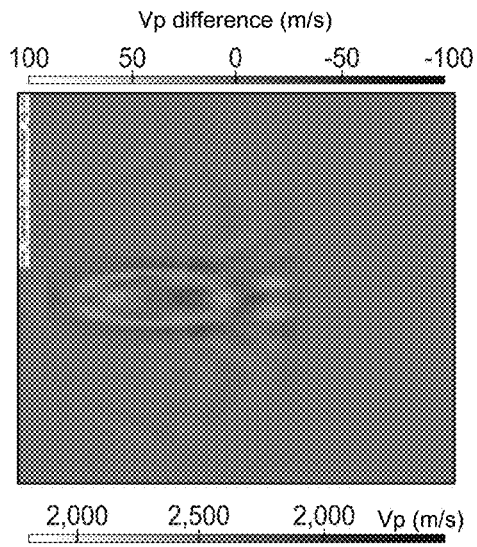
FIG. 3C illustrates the difference between FIGS. 3A and 3B.
Figure 3B:
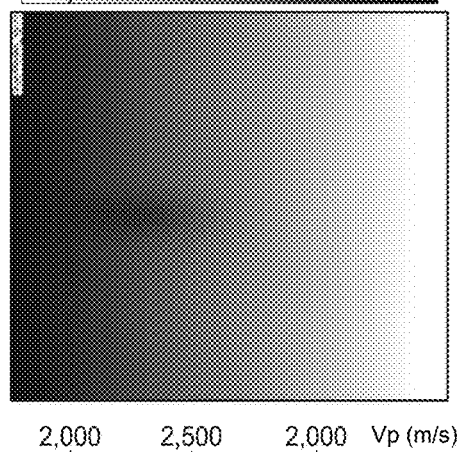
FIG. 3B illustrates the true P-wave velocity model for FIG. 3A.
Figure 3A:
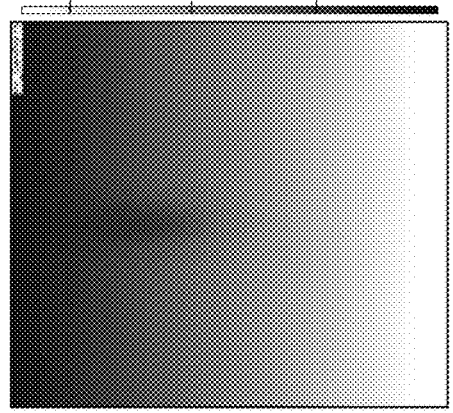
FIG. 3A illustrates P-wave velocity model obtained from a viscoacoustic FWI process.

FIG. 3A shows the inverted Vp model after step 102, the true Vp model (FIG. 3B) and the difference between the left and middle panels (FIG. 3C). It is observed from FIG. 3A that the inverted Vp from step 102 is close to the true VP after the joint inversion of Vp and Qp. The inverted Qp from step 102 is also close to the true Qp as is shown in FIGS. 4A and 4B, wherein FIG. 4A shows the inverted 1/Qp model after step 102 and FIG. 4B shows the true 1/Qp.

Local cost function optimization of seismic data in the acoustic approximation is a common geophysical inversion task, and is generally illustrative of other types of geophysical inversion. When inverting seismic data in the acoustic approximation, the cost function can be written as:

$$\mathcal{F}(\theta) = \tfrac{1}{2} \Sigma_{g=1}^{N_g} \Sigma_{r=1}^{N_r} \Sigma_{t=1}^{N_t} W(\psi_{calc}(\theta, r, t, w_g) - \psi_{obs}(r, t, w_g)),$$

where
$\mathcal{F}(\theta)$=cost function,
$\theta$=vector of N parameters, $(\theta_1, \theta_2, \ldots \theta_N)$ describing the subsurface model,
g=gather index,
$w_g$=source function for gather g which is a function of spatial coordinates and time, for a point source this is a delta function of the spatial coordinates,
$N_g$=number of gathers,
r=receiver index within gather,
$N_r$=number of receivers in a gather,
t=time sample index within a trace,
$N_t$=number of time samples,
W=norm function (minimization function, e.g. for least squares function $(x)=x^2$),
$\psi_{calc}$=calculated seismic data from the model $\theta$,
$\psi_{obs}$=measured seismic data (pressure, stress, velocities and/or acceleration).

The gathers, data from a number of sensors that share a common geometry, can be any type of gather (common midpoint, common source, common offset, common receiver, etc.) that can be simulated in one run of a seismic forward modeling program. Usually the gathers correspond to a seismic shot, although the shots can be more general than point sources. For point sources, the gather index g corresponds to the location of individual point sources. This generalized source data, $\psi_{obs}$, can either be acquired in the field or can be synthesized from data acquired using point sources. The calculated data $\psi_{calc}$ on the other hand can usually be computed directly by using a generalized source function when forward modeling.

FWI attempts to update the discretized model $\theta$ such that $\mathcal{F}(\theta)$ is a minimum. This can be accomplished by local cost function optimization which updates the given model $\theta^{(k)}$ as follows:

$$\theta^{(i+1)} = \theta^{(i)} + \gamma^{(i)} S(\theta^{(i)}),$$

where i is the iteration number, $\gamma$ is the scalar step size of the model update, and $S(\theta)$ is the search direction. For steepest descent, $S(\theta)=-\nabla_\theta \mathcal{F}(\theta)$, which is the negative of the gradient of the misfit function taken with respect to the model parameters. In this case, the model perturbations, or the values by which the model is updated, are calculated by multiplication of the gradient of the objective function with a step length $\gamma$, which must be repeatedly calculated.

For second-order optimization techniques, the gradient is scaled by the Hessian (second-order derivatives of objective function with respect to the model parameters). The computation of $\nabla_\theta \mathcal{F}(\theta)$ requires computation of the derivative of $\mathcal{F}(\theta)$ with respect to each of the N model parameters. N is usually very large in geophysical problems (more than one million), and this computation can be extremely time consuming if it has to be performed for each individual model parameter. Fortunately, the adjoint method can be used to efficiently perform this computation for all model parameters at once (Tarantola, 1984).

FWI generates high-resolution property models for prestack depth migration and geological interpretation through iterative inversion of seismic data (Tarantola, 1984; Pratt et al., 1998). With increasing computer resources and recent technical advances, FWI is capable of handling much larger data sets and has gradually become affordable in 3D real data applications. However, in conventional FWI, the data being inverted are often treated as they were collected in an acoustic subsurface medium, which is inconsistent with the fact that the earth is always attenuating. When gas clouds exist in the medium, the quality factor (Q) which controls the attenuation effect plays an important role in seismic wave propagation, leading to distorted phase, dim amplitude and lower frequency. Therefore, conventional acoustic FWI does not compensate the Q effect and cannot recover amplitude and bandwidth loss beneath gas anomalies.

Viscoacoustic FWI, on the other hand, uses both the medium velocity and the Q values in wave field propagation. Thus, the Q-effect is naturally compensated while wavefront proceeds. In some cases, where shallow gas anomalies overlay the reservoir, severe Q-effect screens off signals and causes cycle skipping issue in acoustic FWI implementation.

Step 102 can include sub-steps 102.1, 102.2, 102.3, and 102.4. Sub-step 102.1 includes computing the gradient of the objective function, which is discussed above. Sub-step 102.2 includes determining the search direction, which is discussed above.

Sub-step 102.3 includes appropriately scaling the search directions for Vp and Qp using the present technological advancement. The present technological advancement can parameterize the model by $\theta=(V_p, 1/Q_p)$. Anisotropy parameters have been omitted for ease of notation. In gradient based optimization methods, the models are updated along the normalized search direction $S_{V_p}$ and $S_{1/Q_p}$ $$V_p = V_p + \alpha S_{V_p},$$

$$1/Q_p = 1/Q_p + \beta S_{1/Q_p},$$

where $\alpha$ and $\beta$ are step sizes of the line search.

The observed data and the current subsurface model are used in computing the gradient of the objective function for each parameter class, resulting in a search direction for each parameter class. The relative scale $\beta/\alpha$ decides the relative parameter updates between Vp and 1/Qp. In the conventional first-order optimization method, $\beta/\alpha=1$.

The line search directions and the objective function contours are illustrated in FIG. 5, wherein $S_{new} = \alpha S_{V_p} + \beta S_{1/Q_p}$. It has been observed that the combined search direction S, obtained with conventional technology, does not point to the location of the minimal objective function value which is indicated by a star in the figure. This implies that the conventional first-order optimization methods converge slowly. After applying an appropriate value of $\beta/\alpha$, the new combined search direction $S_{new}$ points to the location of the minimal objective function value, leading to a much faster convergence than the conventional method.

The appropriate relative scale of $\beta/\alpha$, can be determined as follows. According to constant Q model, the dispersion relation is:

$$V_p^{att}(\omega) = V_p(\omega_0)\left[1 + \frac{1}{\pi Q_p}\log\left(\frac{\omega}{\omega_0}\right)\right],$$

where $V_p^{att}(\omega)$ is the attenuated phase velocity at frequency $\omega$, $V_p(\omega_0)$ is the reference P-wave velocity at a reference frequency $\omega_0$. We would like to maintain $V_p^{att}(\omega)$ while updating $V_p$ and $1/Q_p$, because after the first step of FWI, we have already fitted the travel time of the data to a large extent. The updates of $V_p$ and $1/Q_p$ should thus follow the relation $$\Delta\left(\frac{1}{Q_p}\right) = -\frac{\Delta V_p}{V_p A}\left(1 + \frac{A}{\pi Q_p}\right)\pi,$$

where $$A = \log\left(\frac{\omega}{\omega_0}\right).$$

Therefore, the relative scales between the line search step sizes are determined by $$\frac{\beta}{\alpha} = -\frac{1}{V_p A}\left(1 + \frac{A}{\pi Q_p}\right)\pi \approx -\frac{\pi}{V_p \log\left(\frac{\omega}{\omega_0}\right)}.$$

Advantageously, the ratio $\beta/\alpha$ reduces down to a representation based only on Vp, and not Qp.

A preferred approach to determine the direction of $S_{new}$ may be to assume that either $\alpha$ or $\beta$ has a predetermined value (e.g., equal to 1) and then using the above-noted relationship to determine the other.

Sub-step 102.3 could alternatively include the efficient line search methods for general multi-parameter FWI (Tang and Ayeni, 2015), in which the relative scales between the line search step sizes $\beta/\alpha$ are computed using trial line searches. Although the results are similar, for each iteration of FWI, the computational cost of the present technological advancement is at least 30% lower than that of the method of Tang and Ayeni (2015).

Sub step 102.4 includes performing a line search and updating the models. As step 102.3 determined the direction of $S_{new}$, the size of the step along that direction can be determined using a line search method. A line search involves model-simulating seismic data for various different "step" sizes along the search direction (e.g., $S_{new}$) in the highly multi-dimensional model parameter space. The step size that minimizes the misfit between the model-simulated data and the measured data is selected.

At step 103, the process is repeated for another iteration unless updated models have converged according to some predetermined convergence criterion or has reached another stopping point.

At step 104, the final inverted models are generated.

At step 105, the final models can be used to generate images of the subsurface that are useable to prospect for and/or manage hydrocarbons. As used herein, hydrocarbon management includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities.

In all practical applications, the present technological advancement must be used in conjunction with a computer, programmed in accordance with the disclosures herein. Preferably, in order to efficiently perform FWI, the computer is a high performance computer (HPC), known to those skilled in the art. Such high performance computers typically involve clusters of nodes, each node having multiple CPU's and computer memory that allow parallel computation. The models may be visualized and edited using any interactive visualization programs and associated hardware, such as monitors and projectors. The architecture of system may vary and may be composed of any number of suitable hardware structures capable of executing logical operations and displaying the output according to the present technological advancement. Those of ordinary skill in the art are aware of suitable supercomputers available from Cray or IBM.

The foregoing description is directed to particular embodiments of the present technological advancement for the purpose of illustrating it. It will be apparent, however, to one skilled in the art, that many modifications and variations to the embodiments described herein are possible. All such modifications and variations are intended to be within the scope of the present invention, as defined by the appended claims.

The following references are incorporated by reference in their entirety:

Bai, J., Yingst, D., Bloor, R. and Leveille, J., 2014. Viscoacoustic waveform inversion of velocity structures in the time domain. Geophysics, 79(3), pp. R103-R119. Cheng, X., Jiao;

Cheng, X., Jiao, K., Sun, D. and Vigh, D., 2015, December. A New Approach of Visco-Acoustic Waveform Inversion in the Time Domain. In 2015 SEG Annual Meeting. Society of Exploration Geophysicists;

Denli, H., Akcelik, V., Kanevsky, A., Trenev, D., White, L. and Lacasse, M., 2013. Full-wavefield inversion for acoustic wave velocity and attenuation. In 2013 SEG Annual Meeting. Society of Exploration Geophysicists;

Malinowski, M., Operto, S. and Ribodetti, A., 2011. High-resolution seismic attenuation imaging from wide-aperture onshore data by visco-acoustic frequency-domain full-waveform inversion. Geophysical Journal International, 186(3), pp. 1179-1204;

Plessix, R. E., Stopin, A., Kuehl, H., Goh, V. and Overgaag, K., 2016. Visco-acoustic full waveform inversion. In 78th EAGE Conference and Exhibition 2016. European Association of Geoscientists and Engineers;

Prieux, V., Operto, S., Virieux, J. and Brossier, R., 2012. Multiparameter full waveform inversion of multicomponent ocean-bottom-cable data from Valhall. Part 1: imaging compressional wavespeed, density and attenuation. Geophysical Journal International, 194(3), pp. 1640-1664;

Tang, Y. and Ayeni, G., 2015. Efficient line search methods for multi-parameter full wavefield inversion. US patent application, US2015/0323689;

Tarantola, A., 1984, Inversion of seismic reflection data in the acoustic approximation: Geophysics, 49, 1259-1266;

US Patent Publication 2015/0362622; and

U.S. Provisional Patent Application 62/236,190.

What is claimed:

1. A method for iteratively inverting seismic data to jointly infer a model for at least P-wave velocity and attenuation parameters of the subsurface, said method comprising:

jointly inverting the P-wave velocity and attenuation parameters with an iterative visco-acoustic full wavefield inversion process, wherein the iterative visco-acoustic full wavefield inversion process includes computing a gradient of an objective function, the objective function measuring a misfit between all or part of the seismic data and corresponding model-simulated seismic data;

for each of the P-wave velocity and attenuation parameters, computing a search direction in model space from the gradient;

determining line search step sizes α and β for the search directions for the P-wave velocity and attenuation parameters, respectively, wherein a ratio of the step sizes is a function of the P-wave velocity parameter; and using the step sizes α and β and the search directions for each of the P-wave velocity and attenuation parameters, computing a new search direction in model space, then performing a line search along the new search direction to arrive at a new step size, and using the new step size and the new search direction to generate an updated model for a current iteration of the iterative visco-acoustic full wavefield inversion process;

wherein the step sizes satisfy $$\frac{\beta}{\alpha} \approx -\frac{\pi}{V_p \log\left(\frac{\omega}{\omega_0}\right)},$$

$V_p$ is the P-wave velocity parameter, $\omega$ is frequency and $\omega_o$ is a reference frequency.

2. The method of claim 1, wherein the obtaining the starting P-wave velocity model includes determining, with a computer, the starting P-wave velocity model from an iterative acoustic full wavefield inversion process, wherein the iterative acoustic full wavefield inversion process includes using a cross-correlation objective function to minimize a misfit between all or part of the seismic data and corresponding model-simulated seismic data.

3. The method of claim 1, wherein the objective function is an L2 objective function.

4. The method of claim 1, wherein the objective function is a cross-correlation objective function.

5. The method of claim 1, further comprising:

generating a subsurface image from the updated model; and using the subsurface image to prospect for hydrocarbons.

* * * * *